(12) United States Patent
Grout et al.

(10) Patent No.: US 8,196,893 B2
(45) Date of Patent: Jun. 12, 2012

(54) ISOLATION VALVE WITH CORROSION PROTECTED AND HEAT TRANSFER ENHANCED VALVE ACTUATOR AND CLOSURE APPARATUS AND METHOD

(75) Inventors: Kevin Grout, Denver, CO (US); Jeffrey D. Kiernan, Frederick, CO (US); David Neumeister, Loveland, CO (US); Matthew C. Grout, Blackhawk, CO (US)

(73) Assignee: MKS Instruments, Inc., Andover, MA (US)

( * ) Notice: Subject to any disclaimer, the term of this patent is extended or adjusted under 35 U.S.C. 154(b) by 849 days.

(21) Appl. No.: 12/194,463

(22) Filed: Aug. 19, 2008

(65) Prior Publication Data
US 2009/0255591 A1    Oct. 15, 2009

Related U.S. Application Data

(60) Provisional application No. 61/043,714, filed on Apr. 9, 2008.

(51) Int. Cl.
*F16K 31/00*    (2006.01)
(52) U.S. Cl. ....... 251/63.6; 251/63; 251/335.3; 137/375
(58) Field of Classification Search .................. 137/375, 137/382, 852, 854; 251/335.1, 335.3, 324, 251/366, 334, 62, 63, 63.5, 63.6
See application file for complete search history.

(56) References Cited

U.S. PATENT DOCUMENTS

| | | | | |
|---|---|---|---|---|
| 4,211,387 A | | 7/1980 | Getchell et al. | |
| 4,482,091 A | * | 11/1984 | Lawsing | 236/92 R |
| 4,711,270 A | * | 12/1987 | Fornasari | 137/625.5 |
| 5,597,009 A | * | 1/1997 | Scherrer et al. | 137/375 |
| 5,893,707 A | | 4/1999 | Simmons et al. | |
| 5,915,410 A | * | 6/1999 | Zajac | 137/341 |
| 6,478,043 B2 | * | 11/2002 | Ishigaki | 137/341 |
| 6,805,152 B2 | * | 10/2004 | Kanzaka et al. | 137/341 |
| 2003/0178064 A1 | | 9/2003 | Fukuda et al. | |
| 2006/0266962 A1 | * | 11/2006 | Kanzaka et al. | 251/63.6 |
| 2007/0090095 A1 | | 4/2007 | Yoshida et al. | |
| 2008/0111095 A1 | * | 5/2008 | Naitoh et al. | 251/335.3 |
| 2008/0185062 A1 | * | 8/2008 | Johannes Nijland | 137/854 |

OTHER PUBLICATIONS

International Search Report for PCT/US09/39665, ISA, Aug. 20, 2009.

* cited by examiner

*Primary Examiner* — Stephen M Hepperle
*Assistant Examiner* — Seth Faulb
(74) *Attorney, Agent, or Firm* — James R. Young; Cochran Freund & Young LLC

(57) ABSTRACT

An isolation valve includes a shield that surrounds and protects the valve closure actuator components from exposure to corrosive fluids that flow through the valve when the valve is open.

18 Claims, 7 Drawing Sheets

US 8,196,893 B2

ISOLATION VALVE WITH CORROSION PROTECTED AND HEAT TRANSFER ENHANCED VALVE ACTUATOR AND CLOSURE APPARATUS AND METHOD

BACKGROUND

1. Field of the Invention

This invention is related to fluid control valves and more specifically the corrosion resistant and heated valve apparatus and methods.

2. State of the Prior Art

Valves are used in myriad applications in which corrosive gases or liquids of various kinds have to flow through them. In some applications, for example, in some chemical vapor deposition (CVD) systems, certain valves have to handle both materials that are themselves corrosive and others that tend to react with each other and/or that may tend to condense or otherwise deposit in the valves and other piping and system components.

To avoid or at least minimize such unwanted condensation and/or deposition, the valves, piping, and other components are often made with stainless steel or other corrosion resistant materials and are heated in order to maintain their temperatures high enough to vaporize any materials that start to condense on their surfaces or to prevent reactions that, at lower temperatures, may form byproducts which would deposit on the surfaces. Pipe components are relatively easy to heat and maintain above such unwanted condensation or other reaction temperatures because of their relatively uniform shapes and dimensions, but valves are more difficult to heat uniformly. Even with electric heater jackets or blankets surrounding their exterior surfaces, "cold spots" are common at some exterior and interior surfaces where contact with the heater jacket is not direct. "Cold spot" in this context means a spot or location on or in a valve or other component where the temperature cannot be maintained at a desired heated level during operation.

BRIEF DESCRIPTION OF THE DRAWINGS

The accompanying drawings, which are incorporated herein and form a part of the specification, illustrate some, but not the only or exclusive, example embodiments and/or features. It is intended that the embodiments and figures disclosed herein are to be considered illustrative rather than limiting.

DETAILED DESCRIPTION OF EXAMPLE EMBODIMENTS

Figure 1:
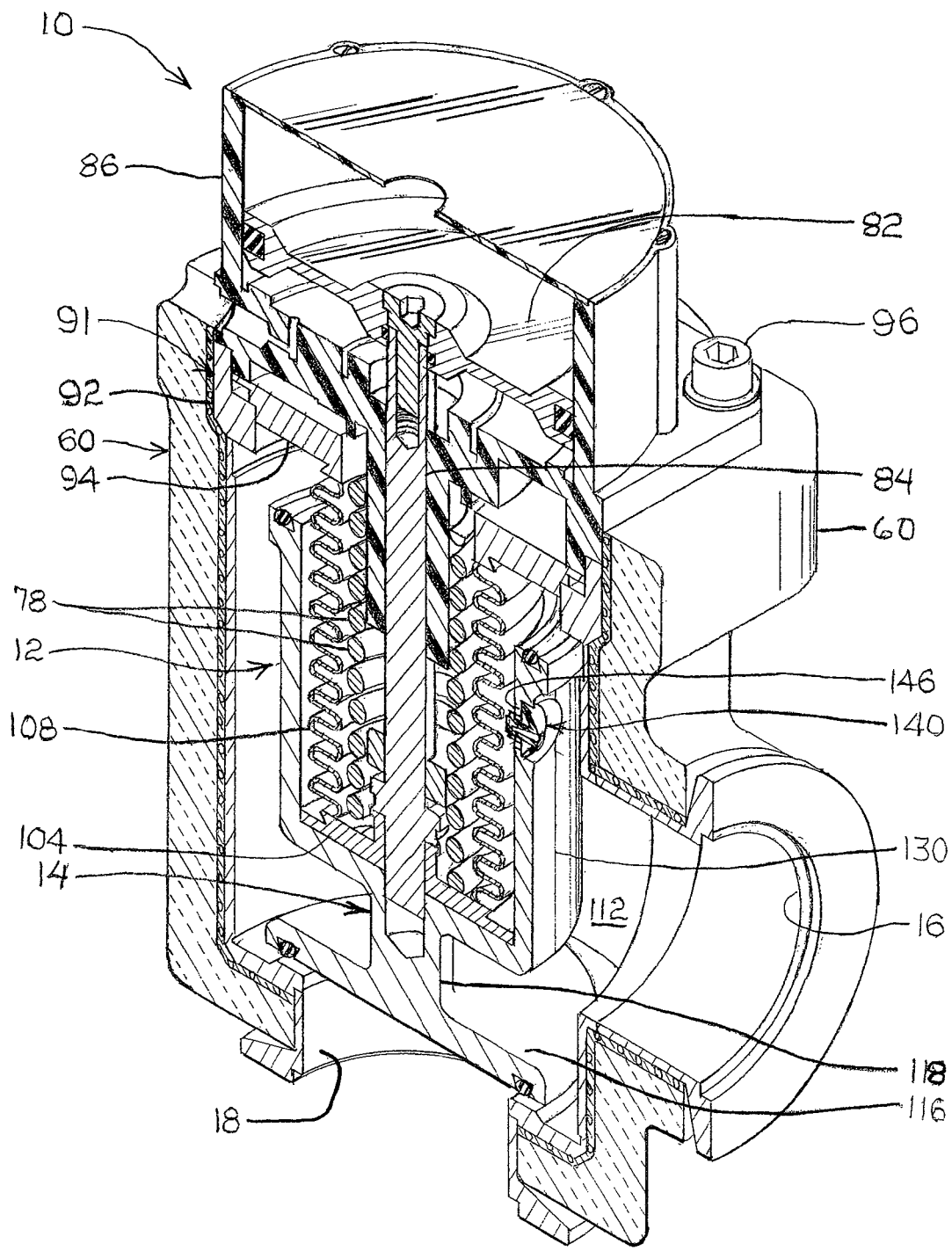
FIG. 1 is an isometric, cross-section view of an example isolation valve that is covered by a heater jacket and which is equipped with a corrosion protected and heat transfer enhanced valve actuator and closure apparatus.

An example isolation valve 10 with corrosion protected and heat transfer enhanced actuator and closure apparatus 12 is shown in FIG. 1. It is essentially a pneumatically actuated, on-off valve with a closure member 14 that either allows or precludes flow of fluid between a first port 16 and a second port 18. In the example installation described herein, the first port 16 is the inlet port, and the second port 18 is the outlet port, but it could be the opposite.

Figure 2:
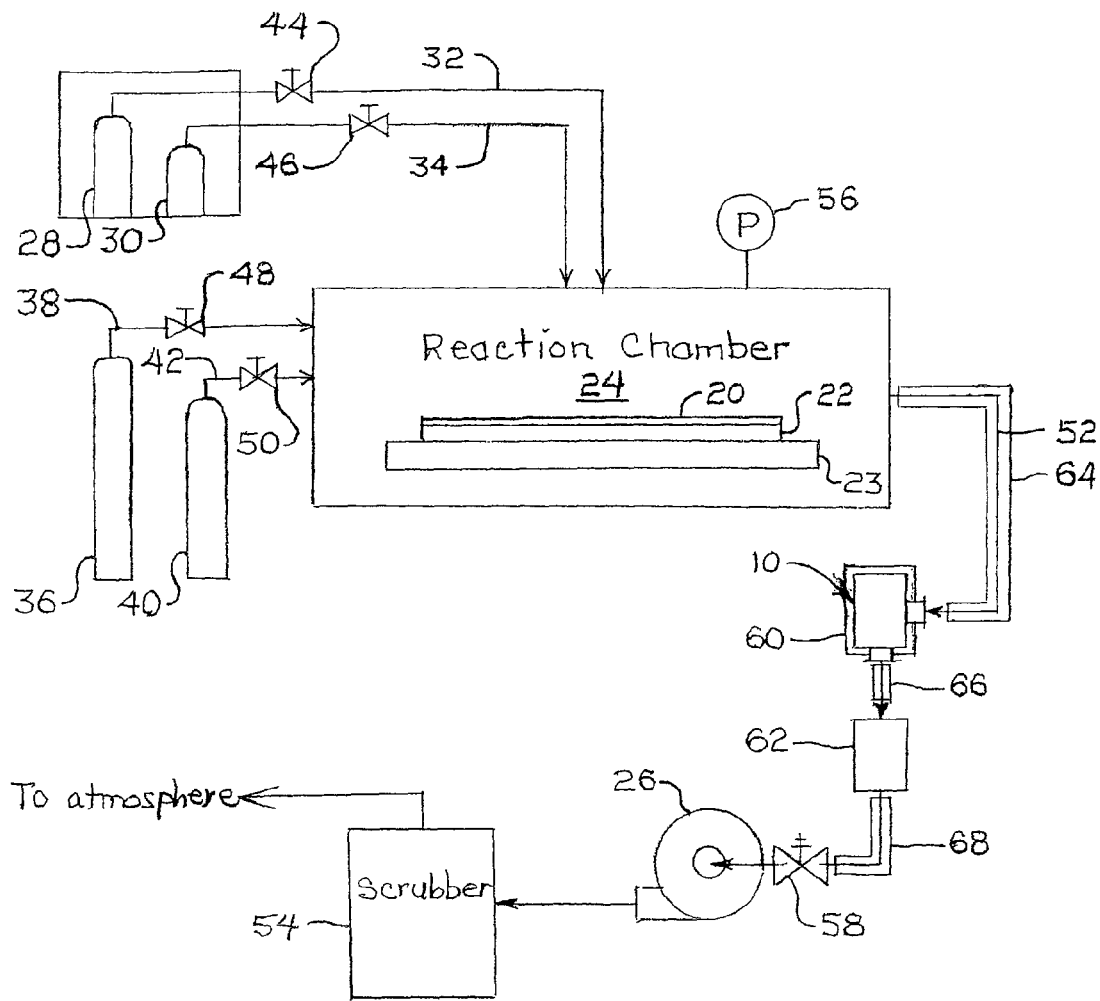
FIG. 2 is a schematic diagram of an example chemical vapor deposition (CVD) system in which an isolation valve, such as the example isolation valve in FIG. 1, can be used.

A schematic diagram in FIG. 2 illustrates an example use of the isolation valve 10 in a chemical vapor deposition (CVD) system. In FIG. 2, a thin film coating of material 20 is deposited on a wafer 22 in a CVD reaction chamber 24, which is evacuated by a vacuum pump 26. One or more feed gases comprising one or more reaction constituents are flowed from source gas containers 28, 30 through reactant feed gas flow lines 32, 34 into the reaction chamber 24, where they react with each other and/or are dissociated in plasma to form the desired thin films 20 on the wafer 22. The film 20 can be a semiconductor, a dielectric, a conductor, a protective coating, a mask coating, or any of a variety of other materials, as is well-known to persons skilled in the art. In such CVD deposition processes, the same kinds of materials 20 that deposit or grow on the wafer 22 will also deposit or grow on other surfaces, including inside walls, platform 23, etc., in the reaction chamber 24, where they are not desired. Therefore, such deposits have to be cleaned out of the reaction chamber 24 in periodic maintenance procedures. Some of such materials are hard and difficult to remove, so they are essentially etched away in situ by highly reactive gas etchants.

For example, but not for limitation, silicon nitride (SiN) or hydrogenated silicon nitride ($SiH_xN_y$) is a common protective coating material, dielectric material, or mask material that can be produced by reacting silane ($SiH_4$) with ammonia ($NH_3$) to deposit SiN or $SiH_xN_y$ film coatings on wafers of semiconductor or other materials. Of course, the SiN or $SiH_xN_y$ also deposits on the inside walls and other surfaces of the reaction chamber 24. It is a common practice after producing a number of SiN or $SiH_xN_y$ coatings to clean the inside of the reaction chamber in situ by flowing a reactive etchant gas, for example, nitrogen trifluoride ($NF_3$) or tetrafluoromethane ($CF_4$) and nitrous oxide ($N_2O$), to etch away the unwanted SiN or $SiH_xN_y$ on the inside surfaces of the chamber 24.

Referring again to the FIG. 2 example system, an inert carrier or dilution gas, such as argon (Ar), from an inert or carrier gas source container 36 may be flowed via a carrier gas flow line 38 through the reaction chamber 24 during the CVD reactions, and they may be used after the reactions are stopped to sweep any unreacted reaction feed gases and reaction byproducts out of the reaction chamber 24. The etchant gas may be fed from an etchant gas source container 40 via an etchant gas flow line 42 into the reaction chamber 24 for in situ cleaning, as explained above, and when the in situ cleaning processes are complete, any excess etchant gases may be flushed or swept out of the reaction chamber 24 by a flow of the inert carrier or dilution gas through the chamber 24. The reactant feed gases can be controlled and turned on and off by reactant feed gas valves 44, 46 in the reactant feed gas lines 32, 34. Likewise, the inert carrier or dilution gas and the etchant gas can be controlled and turned on and off by valves 48, 50, respectively, in flow lines 38, 42.

The reaction byproducts, unreacted feed gases, and/or inert carrier or dilution gases are drawn out of the chamber 24 by the vacuum pump 26 via a foreline 52, and the reactant and reaction byproduct gases may be scrubbed out of the gas flow by scrubber apparatus 54 before it is exhausted into the atmosphere. The pressure can be monitored in the chamber 24 by any of a variety of pressure measuring or reading devices 56, and it can be controlled by a pressure control valve 58 in the foreline 52.

In many CVD systems, the reaction byproducts may have a tendency to condense as they cool in the foreline 52 and in other components, including valves, downstream from the CVD reaction chamber 24, which can clog the foreline pipes and other components and may be damaging to the vacuum pump 26. Therefore, pipe heaters, for example pipe heaters 64, 66, 68, and valve heaters, for example valve heaters 60, may be used to maintain the byproduct gases above their condensation temperatures to avoid or minimize condensation. Some CVD systems may also be equipped with a trap 62 for removing condensable byproducts, un-reacted reactant gases, or other materials from the fore-line 52 before they reach the vacuum pump 26.

Many CVD systems may also be equipped with any of a variety of other equipment or components not shown in FIG. 2, for example, load lock apparatus for moving wafers into and out of the chamber 24, reaction byproduct filters, measuring and gauge devices, and many others known to persons skilled in the art.

The isolation valve 10 positioned in the foreline 52 downstream from the reaction chamber 24, as shown in FIG. 2, is typically used to isolate the reaction chamber 24 from the atmosphere and other contaminants when components downstream, such as the vacuum pump 26, trap 62, filters (not shown), or other components have to be removed for maintenance, repair, or replacement. During normal wafer 22 processing with a vacuum in the chamber 24 and during in situ cleaning with etchant gases, the isolation valve 10 is usually open to allow the gases in the foreline 64 to flow to the vacuum pump 26 and other components. However, the isolation valve 10 may be closed to prevent contaminants from flowing back into the reaction chamber 24 before the vacuum pump 26 is shut down and during times when the vacuum pump 26, trap 62, or other downstream components are opened or removed. The isolation valve 10 may also be closed during some wafer 22 processing steps, for example, when a processing recipe requires that the pressure in the reaction chamber 24 be brought up to ambient or to some other pressure level higher than the pressure maintained by the vacuum pump 26 downstream from the valve 10.

Figure 3:
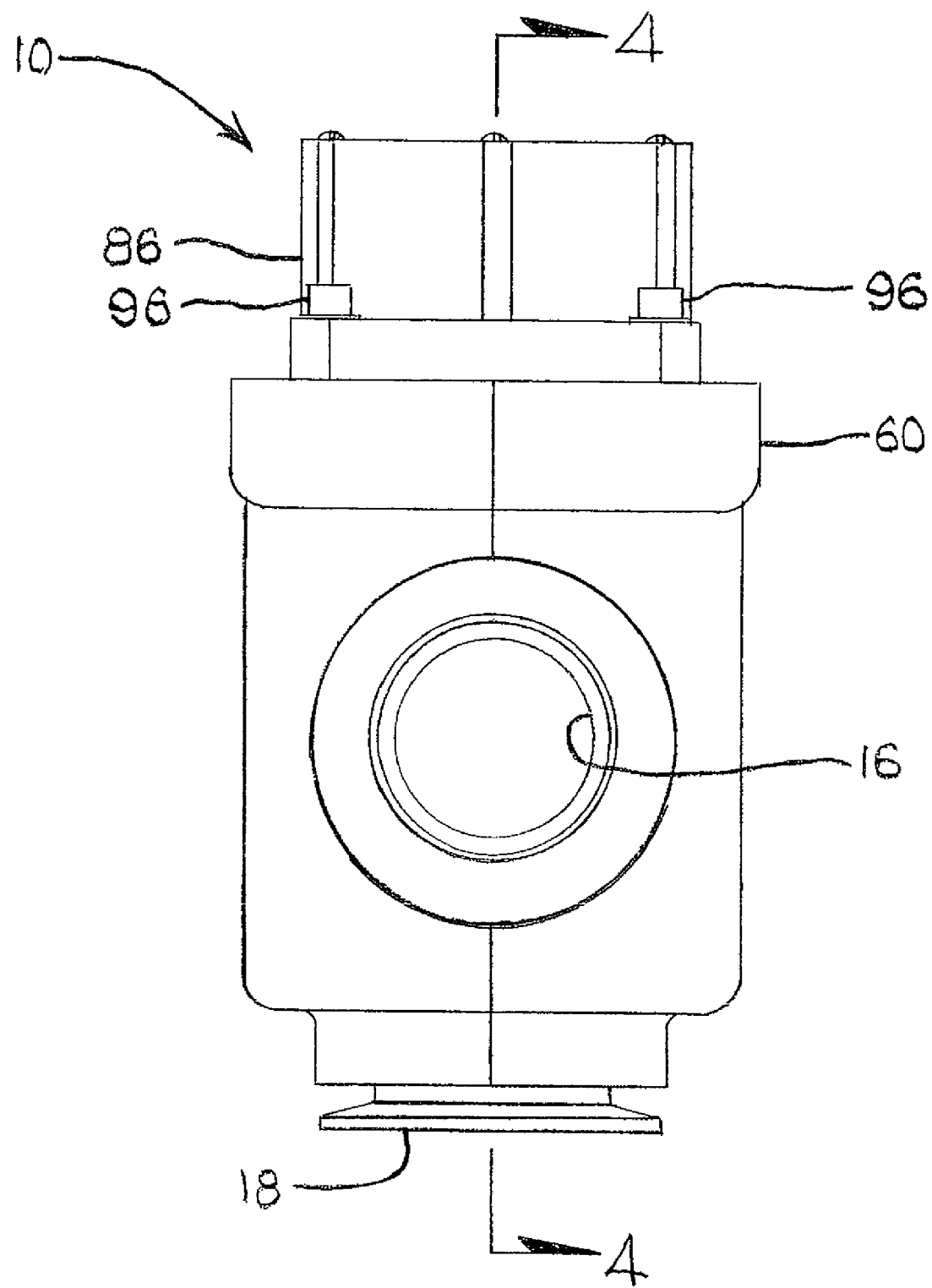
FIG. 3 is a side elevation view of the example isolation valve in FIG. 1.
Figure 4:
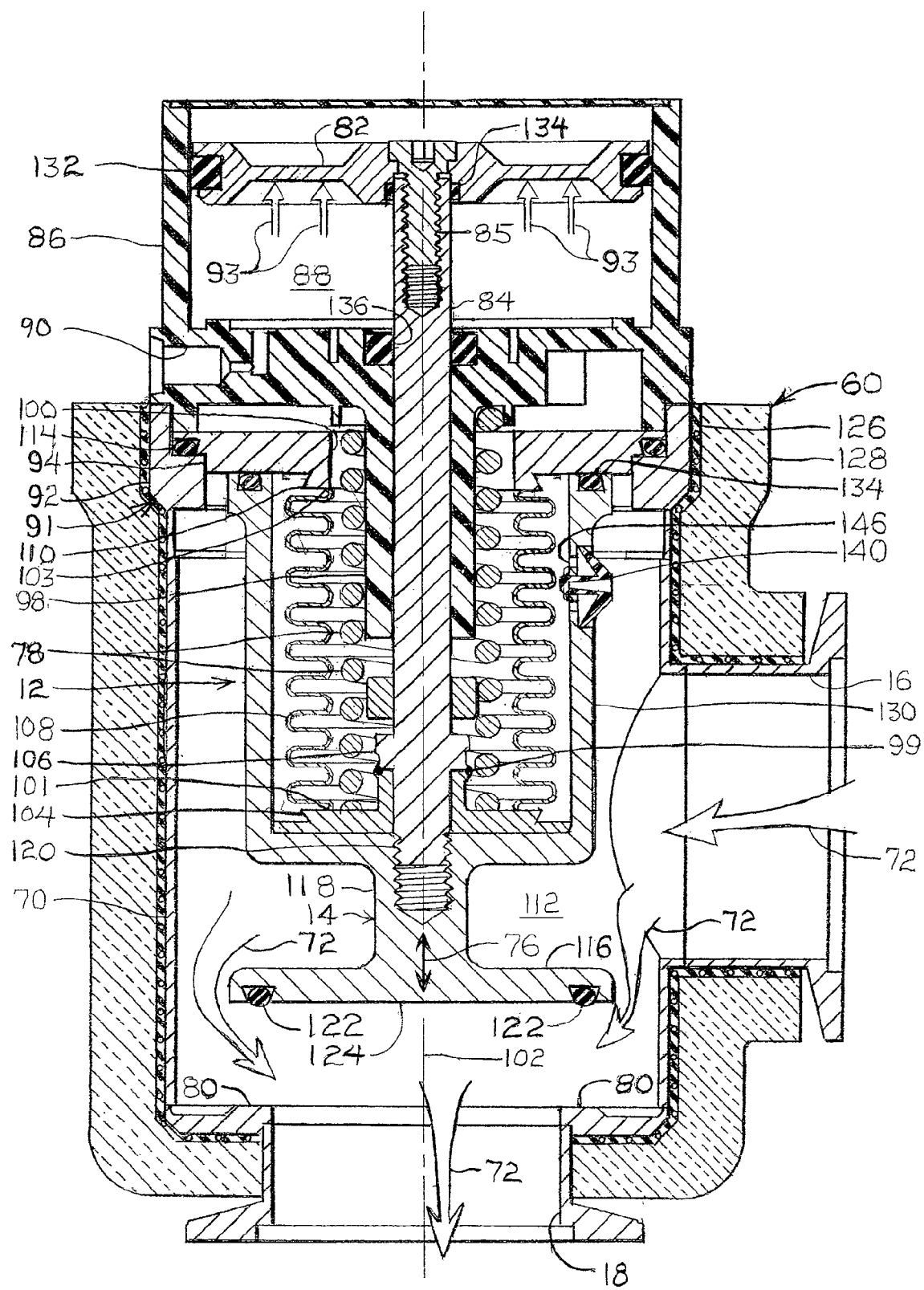
FIG. 4 is a cross-section view of the example isolation valve taken along section line 4-4 in FIG. 3 showing the valve in open and protective mode.

Referring now primarily to FIG. 4, which is a cross-section view of the example isolation valve 10 taken along section line 4-4 in the side elevation view of FIG. 3, the gas flow through the valve body 70 in this example is from the first port 16 to the second port 18, as indicated by flow arrows 72, but it could be from the second port 18 to the first port 16, if desired. Therefore, in this example, the first port 16 is the inlet port, and the second port 18 is the outlet port. The valve closure member 14 is movable upwardly and downwardly, as indicated by arrow 76, to open and close the valve 10, as will be described in more detail below. The valve closure member 14 is shown in the open position in FIGS. 4 and 5 and in the closed position in FIG. 6. The terms "upwardly", "downwardly", "top", "bottom", or other directional terms are used for convenience as being relative to the view orientation in FIGS. 4-6, not to any position or orientation in actual use, which does not have to be the same as the orientation shown in FIGS. 4-6.

The example valve 10 is illustrated as a normally closed pneumatic valve in which the spring force applied by the compression spring 78 is to force the closure member 14 to seat on the annular valve seat 80 on the bottom of the valve body 70 around the outlet port 18, although it could be a normally open valve. It could also be actuated by electric solenoid, hydraulic, or any other actuator mechanism instead of being pneumatically actuated.

Figure 6:
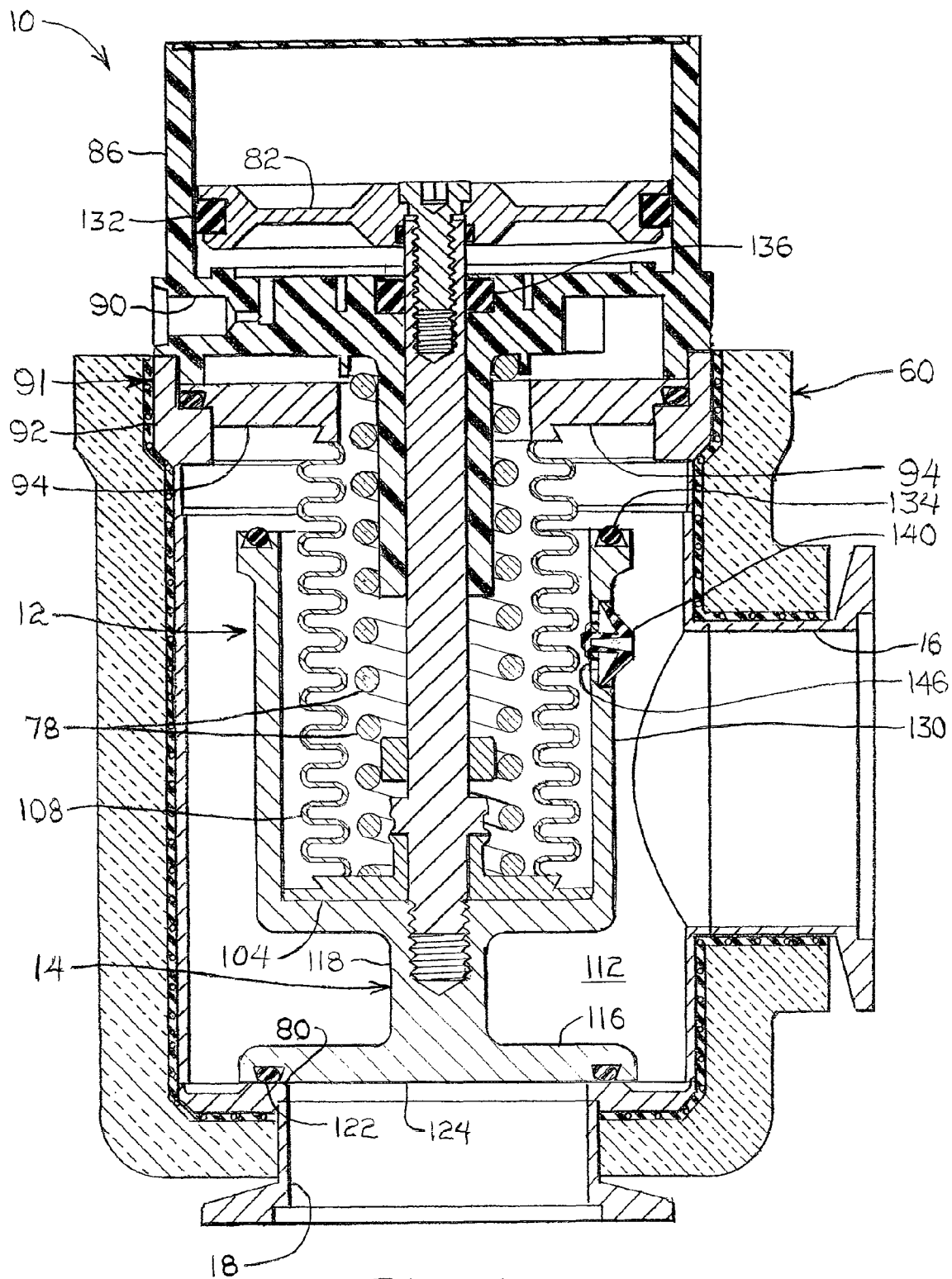
FIG. 6 is a cross-section view of the example isolation valve similar to FIG. 4, but with the valve in closed and system isolation mode.

In the normally closed, pneumatically actuated example valve 10 in FIG. 4, a pneumatic piston 82 connected to a piston rod 84, for example by a bolt 85, is slidably movable upwardly and downwardly along a longitudinal axis 102 in a cylinder housing 86 mounted on top of the valve body 70. Pressurized air or other gas is directed into the piston chamber 88 in the cylinder housing 86 under the piston 82 via a pneumatic air flow port 90 through a fitting (not shown) that facilitates connection of a pressurized air supply tube (not shown) to the flow port 90, as is understood by persons skilled in the art. The pressurized air or other gas in the piston chamber 88 under the piston 82 applies an upwardly directed force on the piston 82, as indicated by the force arrows 93 in FIG. 4. With enough air pressure, the upwardly directed force 93 overcomes the spring force of the coiled spring 78 to cause the piston 82 move upwardly to open the valve 10 by moving the valve closure member 14 axially upwardly, away from the valve seat 80, which opens the outlet port 18 to fluid flow, as indicated by arrows 72. As long as the pressurized air or other gas remains in the piston chamber 88 with enough pressure, the valve closure member 14 will remain open. However, when the pressurized air is released from the piston chamber 88, for example, back through the port 90, the force 93 on the piston 82 diminishes so that the spring force of the spring 78 can force the closure member 14 to close the outlet port 18, as shown in FIG. 6.

As shown in FIG. 4, the valve body 70 includes a valve bonnet 91, which, in the example valve 10, comprises a bonnet flange 92 and a bonnet plate 94 on the upper end of the valve body 70. The cylinder housing 86 is set on the bonnet 91 and is held in place by a plurality of bolts 96 (not seen in FIG. 4 because of the orientation, but one of which is visible in FIG. 1) and sealed by an o-ring seal 114. A piston rod guide 98 extends axially downwardly from the cylinder housing 86 through an aperture 100 in the bonnet plate 94 to orient and stabilize the piston rod 84 in alignment with the longitudinal axis 102 of the valve 10.

A bellows flange 104 is slid onto the bottom portion of the piston rod 84 in abutment with a collar 106 on the piston rod 84, where the bellows flange 104 is welded 99 or otherwise sealed vacuum tight to the piston rod 84. A flexible, stainless steel, bellows 108, which is very thin (for example, only about 0.006 inch thick) extends between, and is welded at opposite ends 101, 103 to the bellows flange 104 at the bottom and to an annular collar 110 protruding from the bonnet plate 94 at the top to provide a vacuum tight separation between the valve actuator components, e.g., spring 78, piston rod 84 and piston 82, and the interior fluid flow chamber 112 in the valve body 70. Therefore, the vacuum in the fore-line 52 (FIG. 2) connected to the valve 10 is maintained, and the valve actuator components are isolated by the bellows 108 from the reaction byproducts, un-reacted feed gases, and other substances that flow through the fore-line 52 and through the valve flow chamber 112. The flow chamber 112 is sealed from the outside environment by an o-ring seal 114 between the bonnet flange 92 and the bonnet plate 94.

The valve closure member 14 has a closure nose piece 116 that extends radially outward from a neck portion 118 that is attached, for example by screw threads, to the bottom end 120 of the piston rod 84. An o-ring seal 122 mounted in the bottom surface 124 of the nose piece 116 helps to seal the nose piece 116 to the valve seat 80 when the closure member 14 closes the outlet port 18 as shown in FIG. 6.

The valve closure member 14 also includes a heat conductive, cup-shaped shield 130, to shield the bellows 108 from not only the reaction byproducts, unreacted process gases, and other substances that flow through the valve flow chamber 112 during normal wafer processing, but, more importantly, from the highly corrosive etch gas or gases that flow through the valve flow chamber 112 during in situ cleaning of the reaction chamber 24 (FIG. 2) as discussed above. The shield 130 can be formed as part of the closure member 14, as shown in FIG. 4, or it can be a separate component. Either way, the shield 130 can be considered to be part of the closure member 14. The shield 130 can also perform a beneficial heat transfer function by conducting heat from the valve body 70, when the valve body 70 is heated by a valve heater 60, to proximal and distal portions of the closure member 14 to prevent or minimize "cold spots", thus preventing or minimizing condensation of condensable reaction byproducts or, in some systems, preventing unreacted process gases from reacting in the valve 10.

Some etch gases, for example, $NF_3$; $CF_4$, and others, can corrode through the example 0.006 inch, 321 or 316 stainless steel bellows in as little time as three months of ordinary wafer process operation and in situ cleaning cycles. If holes should get corroded through the stainless steel bellows, the vacuum-tight seal provided by the bellows 108 to maintain the vacuum in the fluid flow chamber 112 would be breached, exposing the fluid flow chamber 112 to the atmosphere and gases flowing through the chamber 112 to contamination. Therefore, the valve 10 would be incapacitated for use in a vacuum system such as that shown in FIG. 2, and it would have to be repaired or replaced. Also, the other valve actuator components would be vulnerable to attack by the etch gases as well as by the reaction byproduct and unreacted process gases. The shield 130 prevents exposure of the bellows 108 to the gases, including highly reactive etchant gases, that flow through the fluid flow chamber 112, thus preventing such damaging corrosion of the bellows 108 by such gases.

An optional vent 146 with or without a one-way bleed valve 140 can be provided in the shield 130 for bleeding trapped, higher pressure gas or air from the inside of the shield 130 adjacent the bellows 108 to the interior valve chamber 112 outside of the shield 130 as the interior valve chamber 112 is evacuated. Essentially, if air or gas at atmospheric or other higher pressure is trapped in the interior space between the bellows 108 and the shield 130 when the valve closure member 14 moves upwardly to open the isolation valve 10 and thereby seats the o-ring seal 134 of the shield 130 against the bonnet plate 94, and then the interior valve chamber 112 is evacuated to a low pressure (e.g., along with the process chamber 24), that trapped, higher pressure gas or air would be released in a gush, perhaps at sonic speed, as soon as the seal 134 gets moved away from the bonnet plate 94, i.e., when the closure member 14 begins to move toward the valve seat 80 to close the isolation valve 10. Such gushing of gas or air in the interior valve chamber 112 can create turbulence and stir up particulates of process reaction by-products in the interior valve chamber 112 and all the way back through the foreline 52 and into the process chamber 24, which can cause contamination of deposited layers or films 20 on the wafer 22.

The one-way bleed valve or vent 140 mitigates, if not eliminates, that problem by allowing the higher pressure gas or air trapped in the space between the bellows 108 and the shield 130 to bleed into the interior valve chamber 112, and thereby to equalize the pressure in that space with the pressure in the interior valve chamber 112, as the interior valve chamber 112 is evacuated by the vacuum pump 26. Therefore, when the isolation valve 10 closes again, i.e., when the valve closure member 14 moves downwardly to the valve seat 80 and the seal 134 of the shield 130 moves away from the bonnet plate 94, there will be no gush of gas or air from the inside or interior of the shield 130 into the interior valve chamber 112, thus no undesirable turbulence.

If the isolation valve is being used in a system or process in which the gases that pass through it are not severely corrosive, or if they are very corrosive but used infrequently for very short periods of time or not in large quantities, a simple small vent hole 146 through the shield 130 without a one-way bleed valve 140 may suffice for providing the pressure equalization function to avoid undesirable turbulence as explained above. In such circumstances, the shield 130 would still be effective to keep most of such corrosive gases flowing through the isolation valve 10 away from the bellows 108.

However, where severely corrosive gases are flowed through the isolation valve fairly often and/or in high concentrations and/or the exposure of the bellows 108 to such corrosive gases may be for long periods of time, the one-way bleed valve 140, which allows higher pressure air or gases to flow out of the interior of the shield 130 and to prevent corrosive gases from flowing into the interior of the shield 130, is beneficial in protecting the bellows 108 from such corrosive gases. There are, of course, myriad one-way valve mechanisms known to persons skilled in the art that can be used in this application, so the "umbrella" type of one-way bleed valve 140 shown in FIGS. 1 and 4-7 is just one convenient example.

Figure 7:
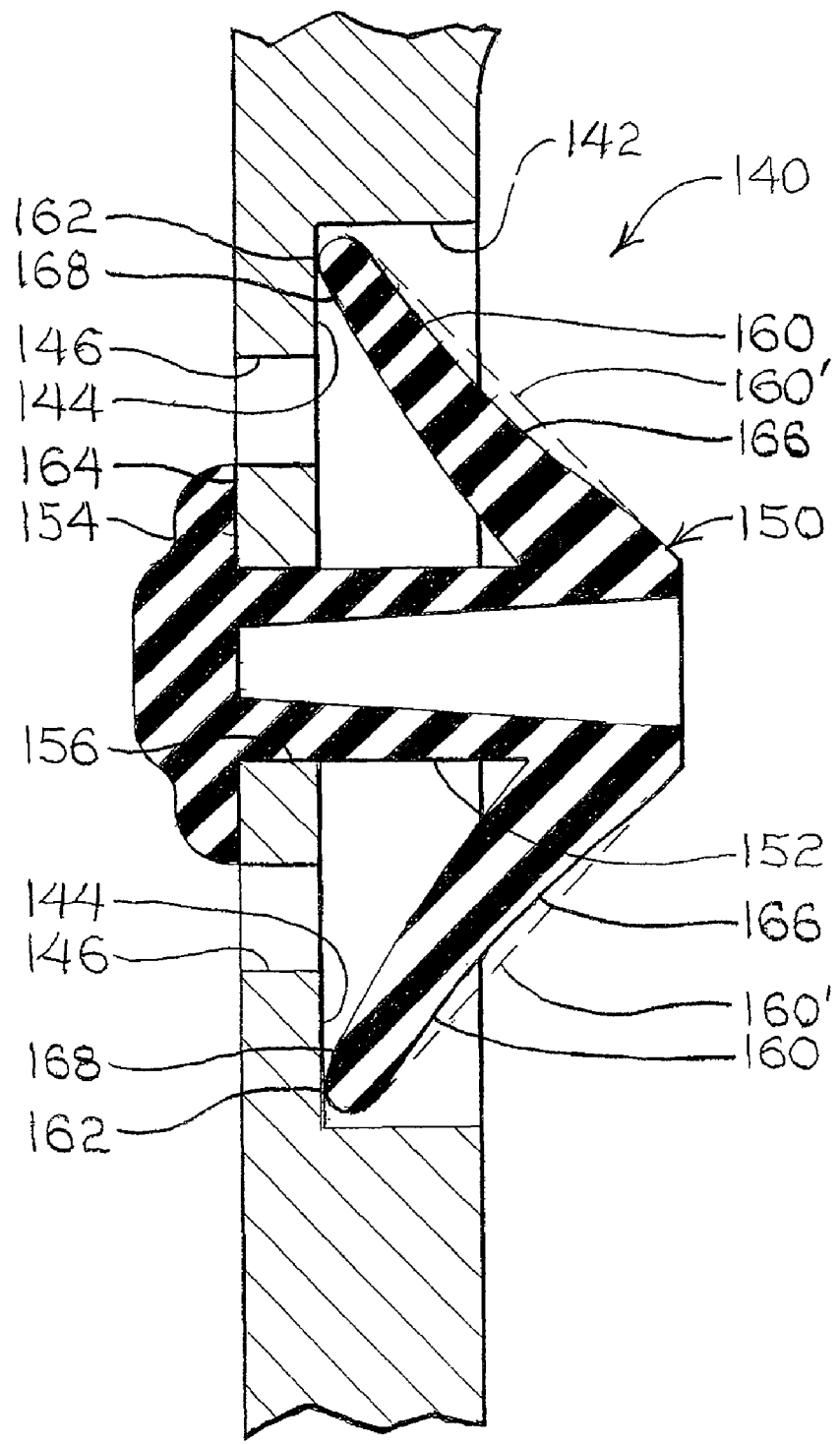
FIG. 7 is an enlarged cross-sectional view of the example one-way bleed valve in the shield portion of the isolation valve.

In this example, as best seen in FIG. 7, a recess 142 may be formed in the shield 130 to provide a flat valve seat surface 144 for the one-way bleed valve 140, and one or more vent holes 146 extend from the flat surface 144 through the shield 130 so that gas or air inside the shield 130 can flow through the vent holes 146 to the outside of the shield 130, i.e., into the interior valve chamber 112 outside of the shield 130. An elastomeric, umbrella-shaped, self-activated, one-way valve component 150 is mounted in the recess 142 by an elastically resilient stem member 152 with an elastically resilient button 154 at the distal end of the stem 152 inserted through an anchor hole 156 that extends from the center of the recess 142 through the wall of the shield 130. An elastically resilient conical closure member 160 extends radially outwardly from the proximal end of the stem member 152 and backwardly into contact with the flat surface 144. The rim 162 contacts and seals against the surface 144 radially outwardly from the vent holes 146. The length of the stem member 152 is preferably short enough in relation to the closure member 14 so that, when the stem member 152 is inserted through the anchor hole 156 and the button 154 bears against the inside surface 164 of the shield 130, the rim 162 of the closure member 160 is seated against the surface 144 to prevent gas in the interior valve chamber 112 outside of the shield 130 from flowing through the vent holes 146 to the inside of the shield 130.

The stem member 152 can be somewhat shorter than is required to just make the rim 162 contact the surface 164, so that in order to position the stem member 152 and button 154 in place in the anchor hole 156, the elastically resilient conical closure member 160 is somewhat deformed or bowed elastically from its normal conical configuration 160', as illustrated in FIG. 7, as the rim 162 is pressed against the surface 144. The resilient molecular memory in closure member 160 that yieldingly resists such elastic deformation or bowing applies a closure or sealing force where the rim 162 contacts the surface 146 to enhance the seal of the one-way bleed valve closure member 160 against flow of gas from the outside of the shield 130 and through the vent holes 146 to the inside of the shield 130. Therefore, if corrosive gas is flowed through the interior valve chamber 112 when the isolation valve 10 is open and the shield 130 is sealed against the valve bonnet plate 94, as explained above, the shield 130 and the one-way bleed valve 140 prevent such corrosive gas from getting inside the shield 130 to contact the bellows 108. If there should happen to be more pressure outside the shield 130 than inside, the net force exerted by the higher pressure on the external surface 166 of the closure member 160 will push the distal rim 162 of the closure member 160 even more tightly against the surface 144 to enhance the seal even further.

However, when the pressure inside the shield 130 is greater than the pressure outside the shield 130, the net force exerted by the higher pressure on the internal surface 168 of the elastically resilient closure member 160 will overcome the molecular memory force of the elastically resilient closure member 160 to unseat the rim 162 from the surface 144 and thereby allow the higher pressure gas or air inside of the shield 130 to bleed through the vent holes 146 to the outside of the shield 130. Therefore, if higher pressure gas or air, for example, air at atmospheric pressure, is caught and sealed inside the shield 130 when the isolation valve 10 closure member 14 is opened to allow the vacuum pump 26 to evacuate the reaction chamber 24, foreline 52, and other system components (see FIG. 2), thereby also lowering the pressure in the internal valve chamber 112, the one-way bleed valve 140 allows the higher pressure gas or air inside of the shield 130 to bleed into the internal valve chamber 112 to also be evacuated. Therefore, as the pressure in the internal valve chamber 112 is pumped down to a desired operating vacuum, the pressure inside the shield 130 is also pumped down, and the pressures inside and outside the shield 130 remain about the same, perhaps with some small residual pressure differential due to the force required to open the bleed valve closure member 160. Prudent selection of the elastically resilient closure member 140 to be made with a material that elastically deforms readily with minimal force can result in any such residual pressure differential being insignificant, i.e., not great enough to cause turbulence when the isolation valve 10 is closed and the shield 130 unseats from the valve bonnet plate 94. Of course, the bleed valve closure member 140 may be made of an elastically resilient material that is also resistant to chemical reaction with the corrosive gases that may be flowed through the isolation valve 10. For example, elastomeric polymers, such as Kalrez 9000™, made by DuPont Performance Elastomers, LLC, of Wilmington, Del., are available with soft, elastically resilient characteristics that is resistant to chemical reaction with corrosive gases, such as the $NF_3$ or the $CF_4$ and $N_2O$, that are often used to etch away unwanted SiN or $SiH_xN_y$, from reaction chambers, as mentioned above. Persons skilled in the art are aware of, or know how to find, other appropriate materials for the one-way valve component 150 for use in various deposition systems and with various deposition or etching materials.

Figure 5:
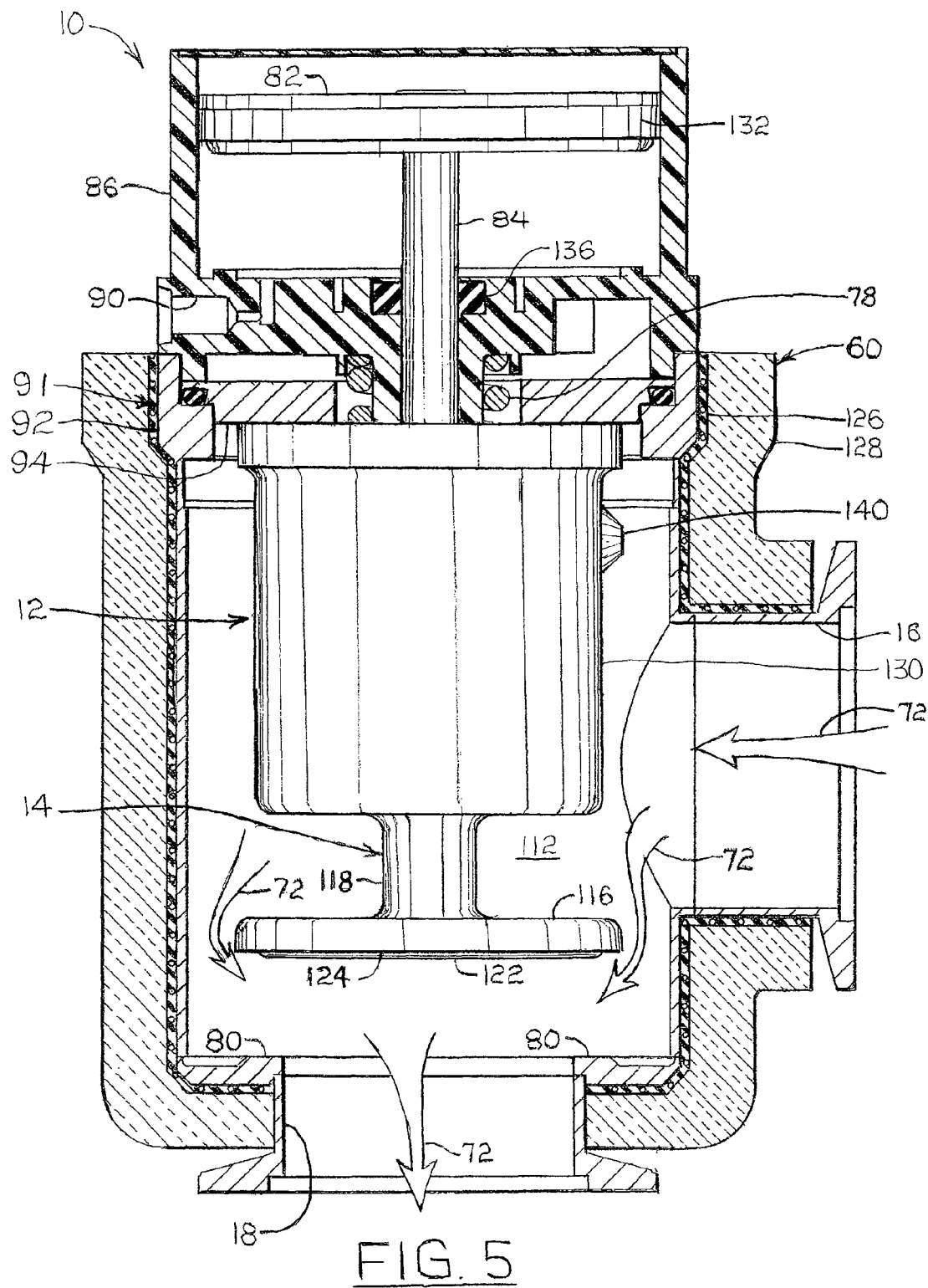
FIG. 5 is a modified cross-section view of the example isolation valve similar to FIG. 4 in the open and protective mode, but showing the pneumatic piston and valve closure member, including the heat conductive shield portion, not in cross-section to illustrate how it isolates the bellows from the valve flow chamber when the valve closure member is open.

Referring again to FIG. 4 in conjunction with FIG. 5, an example valve heater jacket 60 is shown enclosing the valve body 70 of the example isolation valve 10 to prevent or minimize condensation of condensable byproducts in the valve 10. Such valve heaters 60 are well-known and commercially available in the art. The valve heater jacket 60 depicted in FIGS. 4 and 5, for example, is comprised of an electric heating element 126 covered by a sponge or foam rubber insulation layer 128, such as the heaters described in U.S. Pat. No. 5,714,738, but formed to fit the exterior shape and size of the valve body 70. The gases flowing through the valve flow chamber 112, as indicated by arrows 72, conduct heat away from the closure member 14, especially from the nose piece 116, which is directly in the flow path. The thin, stainless steel, bellows 108 is not capable of transferring enough heat from the heat jacket 60 to the nose piece 116 to maintain the temperature of the nose piece 116 at a desired temperature level to prevent condensation on the nose piece 116 in some systems, at least not without heating the rest of the valve body 70 to excessive temperature levels. The piston chamber 88 with its piston seals 132, 134 and grease (not shown) used in the piston chamber 88 to lubricate the seals has to be protected from too much heat, which will deteriorate the grease and could cause other damage. Therefore, the piston cylinder 88 may be comprised of a heat barrier material, for example, Ultem 1000 (trademark) plastic available from Modern Plastics, Inc., of Bridgeport, Conn. However, driving the heater jacket 60 to excessive temperatures to prevent condensation of reaction byproducts on the nosepiece 116 may exceed the heat barrier capabilities of the piston cylinder 86, thus cause damage to the grease and possibly other components in the piston chamber 88.

The heat conductive, cup-shaped shield portion 130 of the valve closure member 14 is preferably metal, for example, aluminum or other good heat conducting metal, including those described herein for corrosion protection and others that may be selected by persons skilled in the art, once they understand the purposes desired as explained herein, so that it can transfer enough heat to prevent or at least minimize formation of a "cold spot" at the nosepiece 116 or other portions of the closure member 14 and thereby prevent or minimize both: (i) corrosion of the bellows 108 by highly reactive etchant gases during in situ cleaning; and (ii) condensation of condensable byproducts on the nosepiece 116 and other portions or components of the valve actuator and closure apparatus 12 during wafer processing operations. As shown in FIGS. 4 and 5, when the pneumatic pressure on the piston 82 forces the closure member 14 upward to move the nose piece portion 116 away from the valve seat 80 to open the valve 10 to the flow of gases 72 through the valve flow chamber 112, the upper rim 132 of the cup-shaped shield portion 130 is forced into abutting contact with the bonnet plate 94. Since the valve closure member 14 is made of a heat conductive material, for example, aluminum or other metal, and the valve body 70 and bonnet plate 94 are also metal, typically, but not necessarily, stainless steel, there is a direct, metal, heat conductive path for heat produced by the heater jacket 60 to flow readily through the valve body 70, bonnet plate 94, and shield portion 130 to the nose piece 116 to help maintain the temperature of the nose piece 116 and other portions of the closure member 14 at high enough temperature levels to prevent or minimize formation of a "cold spot" and condensation without having to drive the heater jacket 60 to excessively high temperatures that could cause excessive heat to the grease and components in the piston chamber 88. At the same time, the cup-shaped shield portion 130 prevents not only reaction byproducts and un-reacted process gases, but also very reactant etch gases flowing through the valve flow chamber 112 from reaching the bellows 108. As shown in FIG. 5, the bellows 108 is completely shielded from the gas flow 72 through the valve flow chamber 112. The o-ring seal 134 in the rim 132 helps to seal the space inside the cup-shaped shield portion 130 from incursion by the etchant gases, but it also squeezes down under the force of the piston 82 to allow the metal-to-metal contact of the metal rim 132 to the metal bonnet plate 94 for good heat conduction.

The shield portion 130 can be made with materials that are resistant to the corrosive gases or other fluids that flow through the valve 10. For example, but not for limitation, aluminum (Al) initially reacts with $NF_3$ to form a dense aluminum fluoride ($AlF_3$) layer, which protects the remaining aluminum material from further reaction. Therefore, in systems wherein $NF_3$ is used as an etchant gas, it may be beneficial for the shield portion 130 to be aluminum, so that it does not corrode in the presence of the $NF_3$ etchant gas flowing through the valve 10, which will enable it to protect the thin, stainless steel bellows 108 from attack by the $NF_3$. On the other hand, if, for example, $CF_4$ is used as the etchant gas, a different material that is more resistant to reaction with $CF_4$, for example, Hastalloy, can be used for the shield portion 108. Other materials that are considered to be corrosion resistant include titanium, nickel, inconel, and others that are known to persons skilled in the art. Also, the closure member 14 with the shield portion 130 can be removed and replaced much easier than the bellows 108, which is welded at both ends. In the example valve 10, the closure member 14 with the shield portion 130 can be screwed off the bottom end 120 of the piston rod 84 to replace it with a new one.

Referring now to FIG. 6, when the pneumatic pressure is removed from the piston chamber 88 so that the spring 78 can close and seat the nose piece 116 of the closure member 14 on the valve seat 80 to isolate the reaction chamber 24 from the atmosphere or components downstream from the example isolation valve 10 (FIG. 2), the rim 132 is pulled away from the bonnet plate 94. However, in ordinary use, there are no corrosive etch gases or byproduct gases flowing in the foreline 52 or through the valve flow chamber 112 when the isolation valve 10 is closed, so the exposed bellows 108 is not exposed to such gases. Therefore, the bellows 108 is protected when it is vulnerable to corrosive gases, as describe above.

The foregoing description provides examples that illustrate the principles of the invention, which is defined by the claims that follow. Since numerous insignificant modifications and changes will readily occur to those skilled in the art once they understand the invention, it is not desired to limit the invention to the exact example constructions and processes shown and described above. Accordingly, resort may be made to all suitable combinations, sub-combinations, modifications, and equivalents that fall within the scope of the invention as defined by the claims. The words "comprise," "comprises," "comprising," "include," "including," and "includes" when used in this specification, including the claims, are intended to specify the presence of stated features, integers, components, or steps, but they do not preclude the presence or addition of one or more other features, integers, components, steps, or groups thereof. The terms upper, upwardly, lower, bottom, top, down, downwardly, vertical, horizontal, and other directional terms in this description are in reference to the diagrammatic orientations depicted in the drawings and are only used for convenience and clarity in this description unless otherwise indicated. They are not intended to limit the valve 10 to any particular orientation in real use applications, and, in fact, the isolation valves with corrosion protected and heat transfer enhanced valve actuator and closure apparatus can be positioned and used in any desired orientation.

The invention claimed is:

1. Valve apparatus, comprising:
   a valve body enclosing a fluid flow chamber, wherein said valve body has an inlet port for flow of fluid into the fluid flow chamber, an outlet port for flow of fluid out of the fluid flow chamber, and a valve bonnet that closes an end of the valve body;
   a closure member mounted from the valve bonnet and positioned in the fluid flow chamber between the inlet port and the outlet port, said closure member being movable back and forth between (i) a open position in which the closure member allows fluid flow through the inlet port into the fluid flow chamber and through the outlet port out of the fluid flow chamber and (ii) a closed position in which the closure member prevents fluid flow through the fluid flow chamber from the inlet port to the outlet port;
   actuator apparatus connected to the closure member for moving the closure member back and forth between the open position and the closed position;
   an expandable and contractible bellows surrounding a portion of the actuator apparatus that extends from the valve bonnet into the fluid flow chamber in the valve body, said bellows being connected between the valve bonnet and the closure member in a manner that forms and maintains a vacuum-tight seal between the actuator apparatus inside the bellows and the fluid flow chamber outside the bellows as the closure member moves back and forth between the open position and the closed position; and
   a cup-shaped corrosion shield extension from the closure member that surrounds the bellows and moves with the closure member toward and away from the valve bonnet as the closure member moves back and forth between the open position and the closed position, wherein said corrosion shield includes a seal that moves into a sealing position in relation to the valve bonnet that isolates the bellows inside the corrosion shield from the fluid flow chamber outside the corrosion shield when the closure member is moved into the open position.

2. The valve apparatus of claim 1, wherein the actuator apparatus includes motive apparatus connected to the closure member and the bellows surrounds the motive apparatus and is sealed vacuum tight between the valve body and the closure member to isolate the motive apparatus from the fluid flow chamber, and wherein the corrosion shield extension isolates the bellows from the fluid flow chamber when the closure member is in the open position to prevent contact between the bellows and fluid flowing through the fluid flow chamber when the closure member is in the open position.

3. The valve apparatus of claim 2, wherein the valve body is metal and terminates at the top with the valve bonnet that is also metal, and wherein the motive apparatus includes: (i) a pneumatic piston in a cylinder housing mounted on the metal bonnet; (ii) a piston slidably mounted in the cylinder housing; (iii) a piston rod that extends from the piston in the cylinder housing to connect to the closure member through an aperture in the valve bonnet; and a spring inside the bellows positioned to apply a force on the closure member in opposition to the piston when pneumatic pressure is applied to the piston.

4. The valve apparatus of claim 3, including a heater jacket surrounding the valve body for applying heat to the valve body and the valve bonnet, and wherein the corrosion shield extension is a heat conductive metal and is movably positioned to be in metal-to-metal contact with the valve bonnet to facilitate heat transfer through metal from the heat jacket through the metal valve bonnet and though the corrosion shield extension to the distal end of the closure member.

5. The valve apparatus of claim 4, where the distal end of the closure member has a nose piece that is shaped and sized to seat and seal on a valve seat in the valve body when the closure member is in the closed position in a manner that prevents fluid flow through the fluid flow chamber.

6. The valve apparatus of claim 4, wherein the corrosion shield extension comprises aluminum.

7. The valve apparatus of claim 4, wherein the valve body and valve bonnet comprise stainless steel.

8. The valve apparatus of claim 4, wherein the cylinder housing comprises plastic.

9. The valve apparatus of claim 2, wherein the bellows is welded to the closure member and to the valve body to vacuum seal the fluid flow chamber outside the bellows from the space inside the bellows.

10. The valve apparatus of claim 1, including a bleed vent through the shield extension.

11. The valve apparatus of claim 10, including a one-way bleed valve positioned at the bleed vent for allowing gas or air to flow through the shield in one direction away from the actuator apparatus to the fluid flow chamber but not from the fluid flow chamber to the actuator.

12. The valve apparatus of claim 11, wherein the one-way bleed valve is self-actuated to open and allow a higher pressure at the actuator to bleed through the shield to the fluid flow chamber.

13. Valve apparatus, comprising:
a valve body that encloses a fluid flow chamber and that has an inlet port and an outlet port;
closure means in the fluid flow chamber movable between an open position for allowing fluid to flow through the fluid flow chamber and a closed position for preventing fluid from flowing through the fluid flow chamber;
actuator means connected to the closure means for moving the closure means between the closed position and the open position;
bellows means surrounding the actuator means and extending between the closure means and the valve body, said bellows means being sealed in a vacuum-tight manner to the closure means and to the valve body for maintaining a vacuum in the fluid flow chamber when the inlet port and outlet port are connected into a vacuum system;
shield means for preventing exposure of the bellows means to corrosive gases that may flow through the fluid flow chamber; and
pressure bleed means for bleeding higher pressure at a side of the shield means adjacent the bellows to lower pressure at a side of the shield means opposite the bellows.

14. The valve apparatus of claim 13, wherein the shield means comprises metal or other heat conductive material for facilitating heat transfer from the valve body to the closure means.

15. The valve apparatus of claim 13, wherein the shield means moves with the closure means and seals against the valve body to isolate the bellows means from the fluid flow chamber when the closure member moves to the open position.

16. The valve apparatus of claim 13, wherein the bleed means includes one-way bleed valve means for allowing gas flow from the side of the shield means adjacent the bellows to the opposite side of the shield means, but for preventing gas flow from the opposite side of the shield means to the side of the shield means that is adjacent the bellows.

17. In a valve that has a fluid flow chamber enclosed by a valve body with an inlet port and an outlet port, a closure member in the fluid flow chamber between the inlet and outlet ports that is movable between an open position and a closed position, an actuator connected to the closure member for moving the closure member between closed and open positions, and a bellows separating the actuator from the fluid flow chamber with a vacuum-tight seal to the closure member and to the valve body, a method of protecting the bellows from corrosive gas that may flow through the fluid flow chamber, comprising:
providing a shield on the closure member that surrounds the bellows and moves into a sealed relationship with the valve body to isolate the bellows from the fluid flow chamber where gases may flow between the inlet and outlet ports when the closure member is moved to the open position.

18. The method of claim 17, including inhibiting condensation on the closure member from gas flowing through the fluid flow chamber by heating the valve body and providing the shield comprised of metal to conduct heat from the valve body to the closure member.

* * * * *